United States Patent [19]

Kenny et al.

[11] Patent Number: 5,298,748
[45] Date of Patent: Mar. 29, 1994

[54] UNCOOLED TUNNELING INFRARED SENSOR

[75] Inventors: Thomas W. Kenny, Glendale; William J. Kaiser, West Covina; Judith A. Podosek, Arcadia, all of Calif.; Erika C. Vote, Golden, Colo.; Howard K. Rockstad, Thousand Oaks; Joseph K. Reynolds, Pasadena, both of Calif.

[73] Assignee: California Institute of Technology, Pasadena, Calif.

[21] Appl. No.: 898,682

[22] Filed: Jun. 15, 1992

[51] Int. Cl.⁵ .......................... G01J 5/00; H01J 37/00
[52] U.S. Cl. ................................. 250/338.1; 250/306
[58] Field of Search .................. 250/306, 423 F, 338.1

[56] References Cited

U.S. PATENT DOCUMENTS

| | | | |
|---|---|---|---|
| 3,887,937 | 6/1975 | Gatos et al. | 250/370.14 |
| 4,906,840 | 3/1990 | Zdeblick et al. | 250/307 |
| 5,043,577 | 8/1991 | Pohl et al. | 250/306 |
| 5,051,379 | 9/1991 | Bager et al. | 437/8 |
| 5,103,174 | 4/1992 | Wandass et al. | 324/209 |

Primary Examiner—Bruce C. Anderson
Attorney, Agent, or Firm—Leonard Tachner

[57] ABSTRACT

An uncooled infrared tunneling sensor in which the only moving part is a diaphragm which is deflected into contact with a micromachined silicon tip electrode prepared by a novel lithographic process. Similarly prepared deflection electrodes employ electrostatic force to control the deflection of a silicon nitride, flat diaphragm membrane. The diaphragm exhibits a high resonant frequency which reduces the sensor's sensitivity to vibration. A high bandwidth feedback circuit controls the tunneling current by adjusting the deflection voltage to maintain a constant deflection of the membrane which would otherwise change deflection depending upon incident infrared radiation. The resulting infrared sensor will meet or exceed the performance of all other broadband, uncooled, infrared sensors and can be miniaturized to pixel dimensions smaller than 100 μm. The technology is readily implemented as a small-format linear array suitable for commercial and spacecraft applications.

17 Claims, 5 Drawing Sheets

UNCOOLED TUNNELING INFRARED SENSOR

ORIGIN OF INVENTION

The invention described herein was made in the performance of work under a NASA contract, and is subject to the provisions of Public Law 96-517 (35 USC 202) in which the Contractor has elected to retain title.

TECHNICAL FIELD

The present invention relates generally to infrared sensors and more specifically to a tunneling transducer having a membrane within tunneling distance of a micromachined tip and having a feedback circuit to electrostatically retain that distance despite infrared energy-induced mechanical forces whereby the feedback circuit provides quantification of incident infrared energy.

BACKGROUND ART

Instruments for the measurement of infrared radiation are becoming increasingly important for a variety of commercial and non-commercial applications. Research into the development of uncooled sensors with response throughout the infrared spectrum has become particularly important due to the limitations on the operation of cooling systems. Uncooled infrared sensors would have important applications for space-based remote-sensing of thermal sources, night vision, target identification, thermal mapping, event detection, motion detection, and others. The limitations of the performance of the existing uncooled sensors often are the primary constraint to the performance of infrared imaging systems for many applications. As a result, there has been considerable investment in the development of uncooled infrared sensors.

A broad assortment of infrared detectors has been developed over the last 40 years. In most cases, they may be classified as either quantum or thermal detectors, depending upon whether the incoming radiation is converted to excitations which are collected, or is converted to heat and detected through changes in temperature. In general, a quantum detector which operates at detector temperature $T_d$ is usually superior to a thermal detector at the same temperature for infrared frequencies: $hu \gg k_B T_d$, where h is Planck's constant and $k_B$ is Boltzmann's constant. However, for infrared frequencies: $hu \ll k_B T_d$, thermal detectors represent the only functional technology. The operation of quantum detectors is limited by the availability of efficient photon conversion mechanisms, while the operation of thermal detectors is limited by the availability of sensitive thermometers. Only thermal infrared sensors operate in the mid-to-far infrared ($\lambda > 10$ μm) and at room temperature.

The pneumatic infrared detector, which was originally developed by Golay, is classified as a thermal detector. Golay's detector consisted of a small cavity filled with gas at room temperature. The cavity is separated from the surroundings by a window and a thin, flexible membrane. The membrane was coated on one side with a thin metallic film, which has significant absorption throughout the infrared spectrum whenever the sheet resistance of the film is approximately half of the impedance of free space. The trapped gas in the Golay cell was heated by contact with the membrane and expanded thermally, which forced the membrane to deflect outward. This deflection is usually detected with optical or capacitive displacement transducers. At present, these detectors are bulky, fragile, difficult to fabricate, and expensive. Nevertheless, they have been widely used, primarily because of their improvement in sensitivity over all other room-temperature detectors in the mid to far infrared range. Attempts to miniaturize the Golay cell for incorporation into focal plane arrays have been unsuccessful because of scaling laws which relate the sensitivity of conventional displacement transducers and their active area. The need for focal-plane arrays of uncooled detectors stimulated the development of pyroelectric detector arrays, the best of which are 5-10 times less sensitive than the Golay cell.

With the above considerations in mind, the present invention is based on the development of an improved Golay cell. This new sensor is constructed entirely from micromachined silicon components. To detect the motion of the membrane, the invention uses an electron tunneling displacement transducer. This sensor, like the assemblies used in Scanning Tunneling Microscopy (STM), detects electrons which tunnel through the classically forbidden barrier between a tip and a surface. As in the STM, the electron current is exponentially dependent on the separation between the tip and the surface. Through use of the electron tunneling transducer, the scaling laws which have prevented the miniaturization of the Golay cell are avoided.

Any new developments in transducer technology that avoid the constraints which relate to the sensitivity and dimensions of classical displacement transducers are very important. The STM, which was invented by G. Binnig and H. Rohrer of IBM Zurich and won the 1986 Nobel Prize in Physics, is based on the measurement of electron tunnel current between a surface of interest and a sharp tip, while the tip is raster-scanned across the surface. This device is capable of resolving atomic-scale structure on the surface of interest and has enabled many pioneering discoveries of the structure and behavior of atoms at surfaces. The most important element of STM is the measurement of tunneling current between the tip and substrate. The tunneling current, I, has the following dependence on the separation, s, between a pair of metallic electrodes:

$$I \propto V \exp(-\alpha \sqrt{\Phi}\, s), \tag{1}$$

where $\Phi$ is the height of the tunneling barrier and V is the bias voltage; V is the small compared to $\Phi$, and $\alpha = 1.025$ (Å$^{-1}$ eV$^{-\frac{1}{2}}$). For typical values of $\Phi = 5$ eV and $s = 7$Å, the current varies by an order of magnitude for each 1 Å change in electrode separation. This sensitivity to relative position is superior to that available in all conventional compact transducers. Since tunneling only occurs in regions where the tip is within several Å of the surface, the active area of the sensor is microscopic. The use of electron tunneling as the active element of a displacement transducer for generic sensor purposes has been pioneered at the Jet Propulsion Laboratory (JPL) over the last several years resulting in the construction of a series of proof-of-concept prototypes. These prototypes initially were constructed from a variety of materials, and served to illustrate that, if designed properly, tunneling could be used in a displacement transducer.

STATEMENT OF THE INVENTION

The present invention comprises an uncooled infrared tunneling sensor in which the only moving part is a membrane which is deflected into contact with a micromachined silicon tip electrode prepared by a novel lithographic process. Similarly prepared deflection electrodes employ electrostatic force to control the deflection of a silicon nitride, flat diaphragm membrane. The membrane exhibits a high resonant frequency which reduces the sensor's sensitivity to vibration. A wide bandwidth feedback circuit controls the tunneling current by adjusting the deflection voltage to maintain a constant deflection of the membrane which would otherwise change deflection depending upon incident infrared radiation. The resulting infrared sensor can meet or exceed the performance of all other broadband, uncooled, infrared sensors and can be miniaturized to pixel dimensions of 100 $\mu$m. The technology can be readily implemented as a small-format linear array suitable for commercial and spacecraft applications.

It is therefore a principal object of the present invention to provide a broadband, uncooled, tunneling infrared sensor which employs an electrostatically stabilized membrane and a feedback circuit to detect infrared radiation.

It is an additional object of the invention to provide an uncooled, broadband, tunneling infrared sensor that utilizes a membrane within tunneling distance of a micromachined tip and comprising a feedback circuit to electrostatically retain that distance despite mechanical forces tending to deflect the membrane.

It is still an additional object of the invention to provide a tunneling infrared sensor having micromachined silicon components.

It is still an additional object of the present invention to provide a tunneling infrared sensor having a mechanical structure including a deflectable membrane wherein the resonant frequency is greater than 30 KHz.

It is still an additional object of the present invention to provide a tunneling infrared sensor having lithographically prepared, atomically clean, gold tunneling electrodes.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF THE INVENTION

The present invention utilizes an electron tunneling displacement transducer composed of micro-machined silicon. Micromachining has been used to produce cm-scale components with $\mu$m-scale precision. Micromachining offers a favorable fabrication technology because it allows for miniaturization and integration with electronics. This device was designed for incorporation into an infrared detector and was optimized to make assembly and testing of the IR detector convenient.

The relative position of the deflection electrodes in the inventive transducer is controlled through use of electrostatic forces applied between the elements. The electrostatic forces induce deflection of a gold-coated micro-machined silicon nitride membrane. Replacement of conventional piezoelectric actuators with an electrostatic actuator is important for the following reasons: First, the electrostatic actuator is insensitive to thermal drifts and immune to the problems of creep associated with piezoelectric actuators. Second, the response of the electrostatic actuator is a function only of the geometry and mechanical properties of the device, whereas the response of piezoelectric actuators is also dependent on the characteristics of the material, which may not be reproducible between devices or over time. Finally, the electrostatic actuator may be miniaturized more easily because the scaling laws are known exactly, and the fabrication is less complex than for the piezoelectric actuator.

Tunneling sensors are fabricated by the following lithographic procedure: Silicon wafers which have already been micromachined to form 30 $\mu$m deep recesses with tips are passivated with 1 $\mu$m $SiO_2$ using a standard steam oxidation process. These wafers are spin-coated with photoresist, and exposed to a lithographic pattern which is used to define the electrode pattern. Since the pattern is formed in the recess, which cannot be in contact with the lithographic mask, the edges of the pattern are blurred by several $\mu$m. After development, which removes the exposed photoresist, the wafers are treated in a plasma of $O_2$, which removes organic residue from the open areas in the photoresist pattern, and sharpens the edge profile of the photoresist.

Metal is then deposited on the photoresist-coated wafer. Gold does not adhere well to clean $SiO_2$, so an adhesion layer of another metal is required before the gold is deposited. Typically, chrome is used, because the first chrome layers deposited readily oxidize, and bond well to $SiO_2$, while the last layers are metallic, and bond well to the gold. Unfortunately, chrome can migrate through the gold layer, eventually forming a nonconductive $Cr_2O_3$ layer on the surface. We have experimentally observed the failure of devices due to the appearance of chrome on the surface of the gold tunneling electrodes. After numerous experiments, we have found that a titanium adhesion layer (150Å), followed by a platinum barrier layer (150Å), followed by a gold electrode layer (2000Å) produces atomically clean gold electrodes. The use of a barrier layer has been widely used in industrial applications by others to prevent diffusion of the electrode metal down into GaAs substrates. We are the first to use such a metal system to prepare atomically clean electrodes for tunneling.

After deposition of the metal layers, the wafer is submerged in a photoresist dissolving solvent (such as acetone) and agitated ultrasonically for an extended period of time (as much as an hour). This lengthy agitation is required for the solvent to soak under the metal which is deposited on photoresist and lift it off. Normal liftoff processes depend on the formation of a sharp edge profile in the photoresist, which greatly increases the access of the solvent to the photoresist. Since sharp edge profiles are not possible in our recessed surfaces, our liftoff takes longer than a normal process.

Finally, the wafers are diced by a standard dicing saw, degreased with TCE, acetone, and methanol, and then treated in plasma of $O_2$ for an extended time. The $O_2$ plasma removes residual hydrocarbons from the gold electrode surfaces.

As a result of this process, patterned, clean electrodes are produced which are suitable for use in a miniature tunneling transducer.

The electron tunneling displacement transducer described above was designed to be used with an infrared sensor. The design of the other components of the infrared sensor was guided by a calculation of its sensitivity. The response and noise of the prototype electron tunneling infrared detector are calculated as for a generic thermal detector. It is important to note that this prototype has not been fully optimized to achieve the best possible sensitivity.

Figure 1:
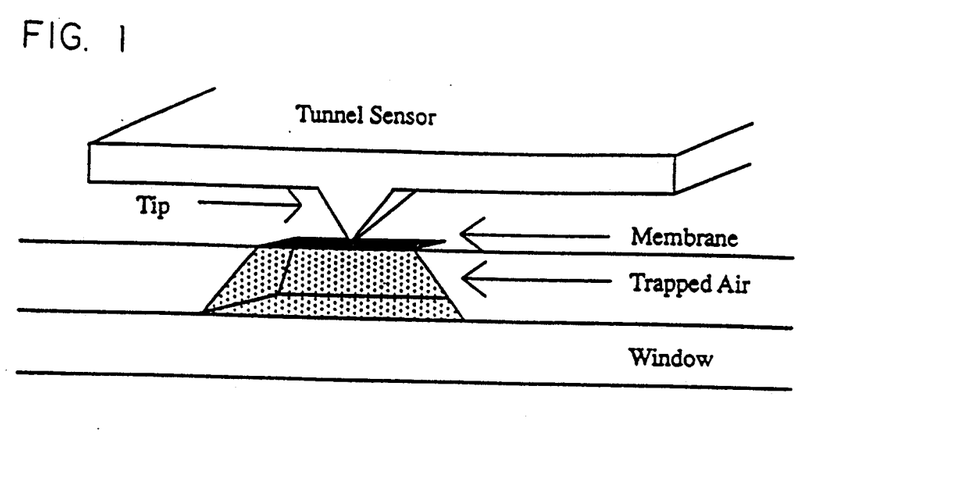
FIG. 1 is a drawing of a tunneling infrared sensor demonstrating the concept of using a tunneling displacement transducer to measure deflection of a membrane driven by infrared-induced expansion of trapped gas.

A cavity of area 0.01 cm² and thickness 0.015 cm, filled with air at atmospheric pressure is trapped between a pair of silicon wafers, one of which has been etched through to a 0.5 $\mu$m thick silicon oxynitride membrane as shown in FIG. 1. The outer surface of the membrane is coated with ~ 100 Å of gold to serve as an electrode for tunneling as well as an efficient absorber of infrared radiation. The beat capacities of the gas, membrane, and gold films sum to $C = 7.9 \times 10^{-7}$ J/K, and the thermal conductances between these elements and the surroundings sum to $G = 1.9 \times 10^{-4}$ W/K. The heat capacity is dominated by the membrane, while the thermal conductance is dominated by conduction through the trapped gas to the window. The mechanical properties of the membrane may be calculated, given its dimensions. The coefficient of motion (change in position per unit change in temperature) of the center of the membrane is approximately $1 \times 10^{-4}$ cm/K, assuming that air is an ideal gas at room temperature and pressure.

When biased at fixed voltage, the tunneling current has the following dependence on tip-substrate separation:

$$I = I_0 \exp(-\beta \sqrt{\Phi} \, s), \qquad (2)$$

where $\Phi$ is the tunnel barrier height in eV, s is the tip-membrane separation in Å, and $\beta$ is a conversion factor with a value of $1.025$ eV$^{-\frac{1}{2}}$Å$^{-1}$. The combined temperature coefficient (fractional change in current per unit change in temperature) of trapped gas and tunnel sensor is $\alpha = (1/I)(\partial I/\partial T) = 2.3 \times 10^4$/K, for $\Phi = 5$ eV. This large temperature coefficient is a product of the large thermal expansion of gases at room temperature, and the extreme sensitivity of vacuum tunneling to changes in relative position. For comparison, $\alpha$ for a high performance resistance bolometer is approximately equal to 1. The responsivity of the electron tunneling infrared detector is then given by:

$$S = \frac{I\alpha}{(G^2 + (\omega C)^2)^{\frac{1}{2}}} = 1.2 \times 10^{-1} \text{ A/W } (\omega = 0). \qquad (3)$$

The contributions of several kinds of noise must be considered. For each source, an expression for the square of the Noise Equivalent Power, (NEP)² appears. The NEP is defined as the signal power that would be detected with a unity signal-to-noise ratio in the presence of a given source of noise. The NEP is an important figure of merit for infrared detectors. The expression for the NEP refers to a bandwidth of 1 Hz. Since the noise sources being considered are broadband, reducing the bandwidth of the measurement (increasing the integration time) is expected to improve the sensitivity. An absorber efficiency of 100% is assumed in this expression.

The expression for the NEP of a thermal infrared detector is:

$$(NEP)^2 = 4k_B T^2 G + \frac{2e(G^2 + (\omega C)^2)}{I\alpha^2} + 16A\sigma k_B T^5. \qquad (4)$$

The first term arises due to temperature fluctuations in the trapped gas, the second term is due to shot noise in the tunnel current, and the third term is due to photon noise. In this expression, $k_B$ is Boltzmann's constant, T is the operating temperature, $\omega$ is the modulation frequency, A is the absorbing area of the detector, and $\sigma$ is the Stefan-Boltzmann constant. Ideally, photon noise would be the largest term in the expression for the NEP.

Noise in amplifiers should not play an important role due to the large transducer sensitivity. Commercial operational amplifiers are readily available that contribute less than the shot noise term to the NEP. A prototype tunneling transducer was fabricated from micromachined silicon and made operational to investigate unexpected noise sources, such as 1/f noise. Over the range of frequencies investigated (2 Hz–10 kHz), all sources of transducer noise were smaller than the expected thermal noise from Equation 4.

Figure 2:
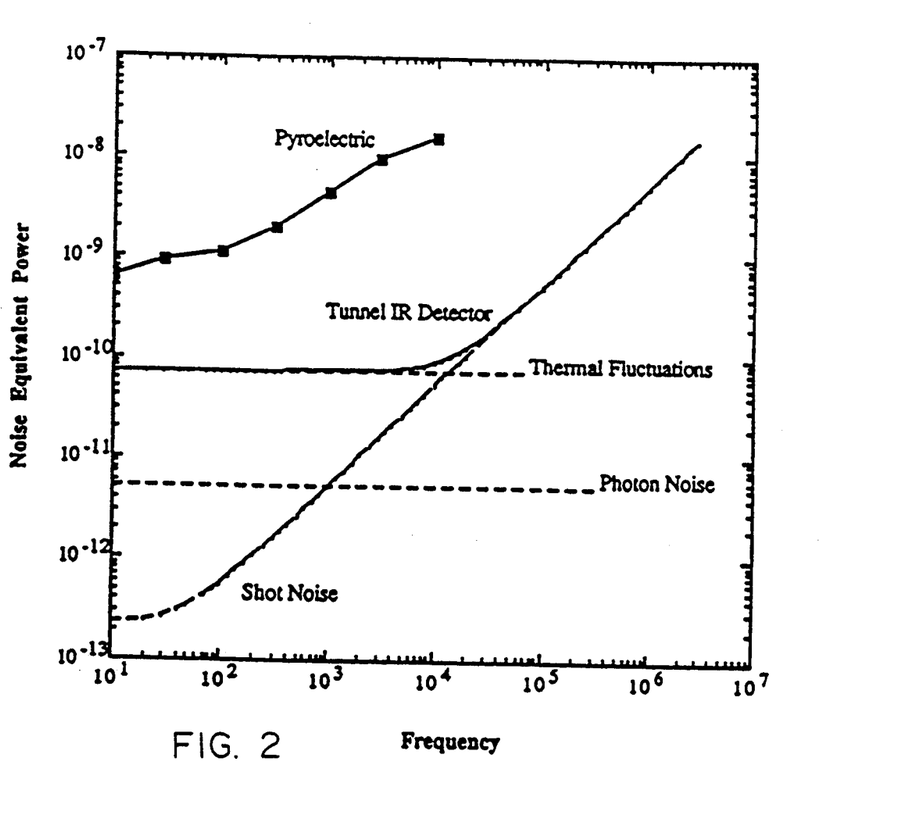
FIG. 2 is a graph illustrating noise sources affecting infrared detector sensitivity.

If one sums these contributions to the noise, and consider the 50% efficiency of the absorber, the predicted NEP of the prototype is $6 \times 10^{-11}$ W/$\sqrt{\text{Hz}}$ at chopping frequencies below 10 kHz. At frequencies below 10 kHz, the NEP is dominated by thermal fluctuations. At frequencies above 10 kHz, the contribution from shot noise dominates the other sources of noise and degrades the NEP of the detector. The calculated contributions to the NEP of the prototype are plotted as a function of frequency in FIG. 2.

Figure 3:
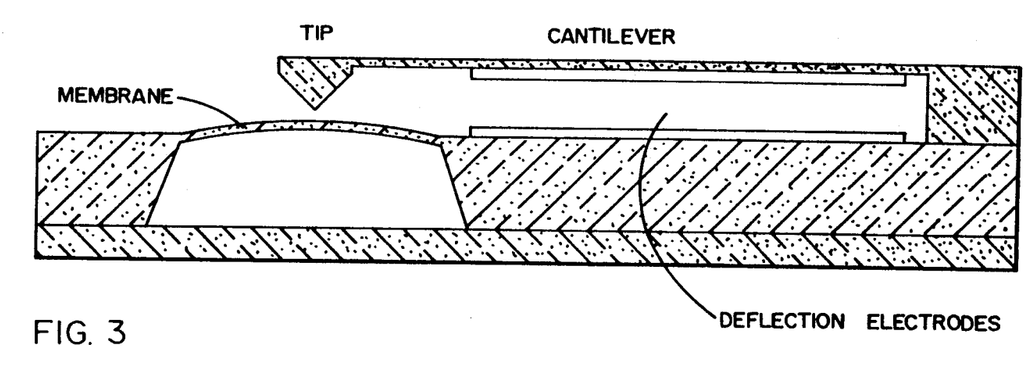
FIG. 3 is a conceptual drawing of a prototype transducer used to demonstrate the concept of the present invention.
Figure 4:
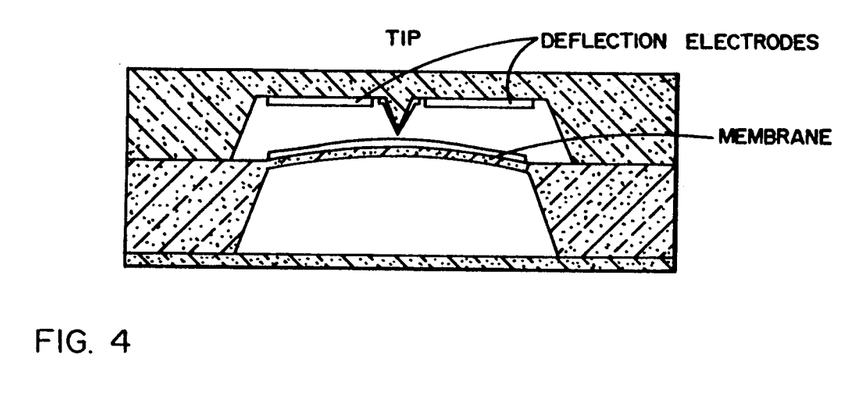
FIG. 4 is a conceptual drawing of the tunneling infrared sensor of the present invention.

A prototype electron tunneling infrared sensor has been fabricated. It is illustrated in FIG. 3. The prototype infrared sensor was made operational and infrared response was observed with a variety of laboratory blackbody sources. A careful calibration was carried out by chopping between 300° K. and 77° K. blackbodies with area 1 cm² located 10 cm from the sensor. Considering the geometric factors and allowing for atmospheric transmittance from source to sensor, the average modulated signal power at the sensor was $1.6 \times 10^{-7}$ W. The signal to noise ratio at the chopping frequency of 10Hz was measured to be 200/$\sqrt{\text{Hz}}$, so the experimental NEP of the prototype infrared sensor is $8\times10^{-10}$ W/$\sqrt{\text{Hz}}$. Noise in this prototype was dominated by the sensitivity of the transducer to mechanical vibration.

The measured sensitivity of the tunneling infrared sensor is already competitive with the best commercial pyroelectric sensors and can be readily improved by an order of magnitude through the use of an optimized transducer.

The prototype tunneling infrared sensor described above was designed to demonstrate the concept of an infrared sensor based on the tunneling displacement transducer. Since it relied upon the first use of a tunneling device made entirely from micromachined silicon, certain characteristics were selected to allow easy operation, instead of optimized sensitivity. With the successful demonstration of this concept, it was appropriate to consider designs that optimize performance.

It is important for any infrared sensor to be insensitive to environmental sources of noise. For example, an infrared detector should not be especially sensitive to vibration. As is well known, early STMs were extraordinarily sensitive to vibration, and required the construction of large, complex vibration isolation systems in order to be used. In order to adapt tunneling for use as a transducer for real applications, the sensitivity to vibration, as well as other environmental stimuli, such as temperature and pressure, must be reduced. Since the tunneling infrared sensor is fundamentally a mechanical structure, the sensitivity to vibration is to be eliminated through careful mechanical design. When a mechanical element is subjected to an acceleration at frequencies below its resonance, the amplitude of deflection is inversely proportional to the square of the resonant frequency. Therefore, sensitivity to vibration is best reduced by increasing the resonant frequency of the elements of the transducer.

To meet the operational requirements for sensing applications of a tunneling infrared sensor, we have designed a new series of micromachined actuators. These new actuators are important because they are designed to offer resonant frequencies above 10 kHz. The new actuators achieve the higher resonant frequencies primarily through reduction in actuator mass by more than 4 orders of magnitude. As a result, the new actuators have smaller range of deflection ($<5$ $\mu$m), which precludes their use for coarse approach between tunneling electrodes. However, with the use of micromachining techniques, it is possible to assemble sensors with the electrode spacing already within the range of the fine control, thereby accomplishing the coarse approach during assembly.

Figure 5:
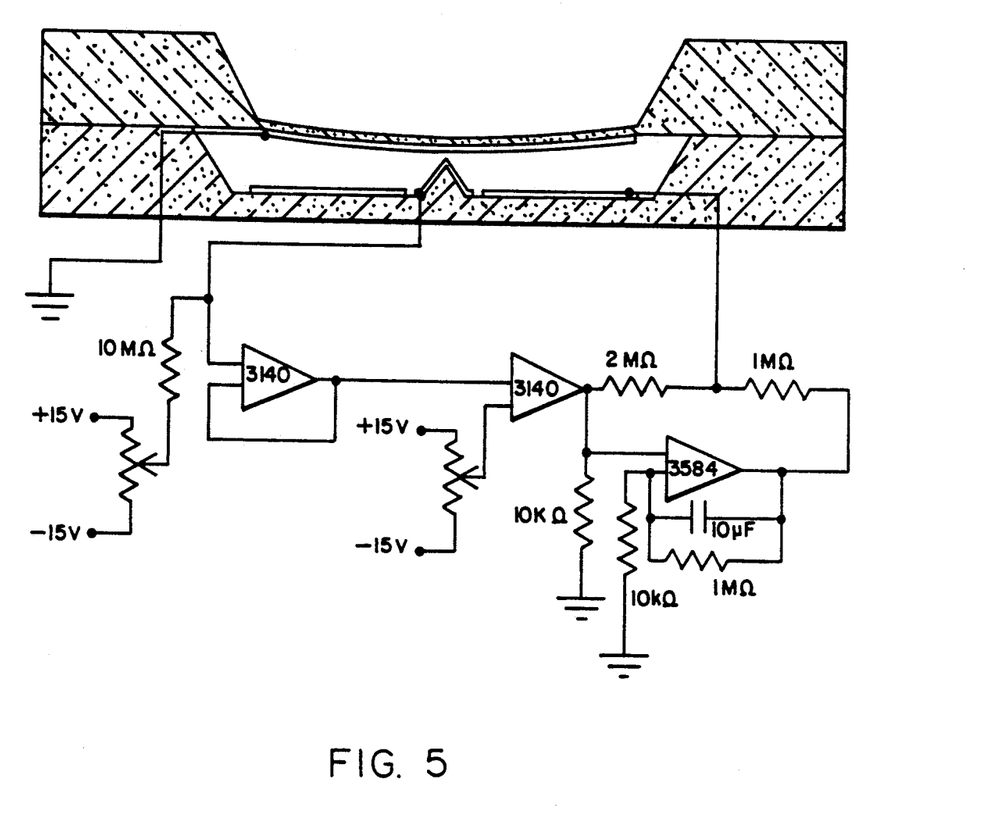
FIG. 5 is a schematic drawing of the infrared sensor of the invention including a feedback circuit used to control the tunneling transducer.

A wide-bandwidth actuator used in the present invention simply consists of a flat diaphragm. These diaphragms are fabricated by coating the front surface of a silicon wafer with low-stress LPCVD silicon nitride. The diaphragms are released by etching square holes through the wafer from the backside with a chemical etchant which does not etch silicon nitride, such as EDP. A drawing of a diaphragm positioned above the tunneling and deflection electrodes is shown in FIG. 5. This device is operated by applying a 150 mV tunneling bias to the tip and grounding the electrode on the membrane. A large voltage is applied to the deflection electrodes, electrostatically attracting the diaphragm down towards the tip. When the membrane is within 10 Å of the tip, a tunnel current of 1 nA appears. The feedback loop compares this current to a reference value and applies an error signal to the deflection electrode, thereby maintaining the position of the diaphragm. If a force is applied to the diaphragm, the feedback loop responds with a balancing force which keeps the diaphragm position fixed. When infrared radiation is absorbed in the sensor, the resulting change in pressure is sensed by the feedback circuit which responds by changing the deflection voltage. The variations in deflection voltage are proportional to variations in absorbed infrared power.

For the infrared sensor, the dimensions of the diaphragm are $2\times2$ mm$^2\times0.5$ $\mu$m. The resonant frequency and stiffness are calculated to be 20 kHz and 1 N/m respectively.

A miniaturized infrared sensor is a scaled down version of the optimized infrared sensor. The following considerations may necessitate modifications to the design:

* As the lateral dimensions of the cell are reduced by an order of magnitude from 1 mm to 100 $\mu$m, the stiffness of the membrane is expected to increase dramatically. To overcome this increased stiffness, the membranes may be thinned from 5000 Å to 1000 Å. Thinning by a factor of 5 should compensate for most of the effects of the reduction in pixel size. An additional design change can be adopted as needed to build-in additional flexibility.

* The present flat membrane may be replaced by a corrugated membrane. The amplitude and wavelength of the corrugation may be easily adjusted to vary the stiffness of the membrane over a wide range.

* The present techniques for microfabrication of the recess with electrodes and tip are not sufficiently precise to allow scaling to 100 $\mu$m pixels. An entirely new structural design will have to be developed to replace the present substrate design.

With the completion of these design and process development activities, individual miniaturized infrared sensors will be fabricated and tested to verify their characteristics, or to guide design modifications.

With the characterization of the miniaturized infrared sensor complete, the design of a small-format (10-20 elements) linear array based on the miniaturized infrared sensor may be carried out. The eventual fabrication and operation of this array is expected to require some partial integration of sensor and feedback circuitry as needed. This integration may involve the use of micromachined substrates which already carry the preamplifier electronics.

With the lowest mechanical resonant frequency of the sensor being above 10 kHz, the gain and bandwidth of the electrical circuit used to control the sensor may be substantially larger than that used in typical STMs or in previous tunneling sensors. Because of this, the feedback circuitry used may be simplified. FIG. 5 shows a typical feedback circuit that has been used to control tunneling between a micromachined tip and the diaphragm actuator.

A voltage drop across a 10 MOhm resistor in series with the tip occurs whenever tunneling occurs. A low noise FET input operational amplifier in follower configuration is used to lower the source impedance. In this configuration, the output of the first preamplifier never exceeds the range between the bias voltage of 150 mV and ground. We have found this preamplifier configuration to be more stable than other possible circuits, such as virtual ground configuration which drives the preamplifier all the way to the supply voltage in the event of a tip contact. A simple op-amp circuit is then used to compare the preamplifier output with a reference input and generate an error signal. This low-voltage, wide-bandwidth error signal must then be added to a high-voltage, narrow-bandwidth offset to produce the voltage which is applied to the deflection electrodes. The high voltage signal may be generated by a power supply which is periodically adjusted to keep the error signal near zero. A simple high voltage amplifier circuit with very low bandwidth can perform this function as well.

Figure 6:
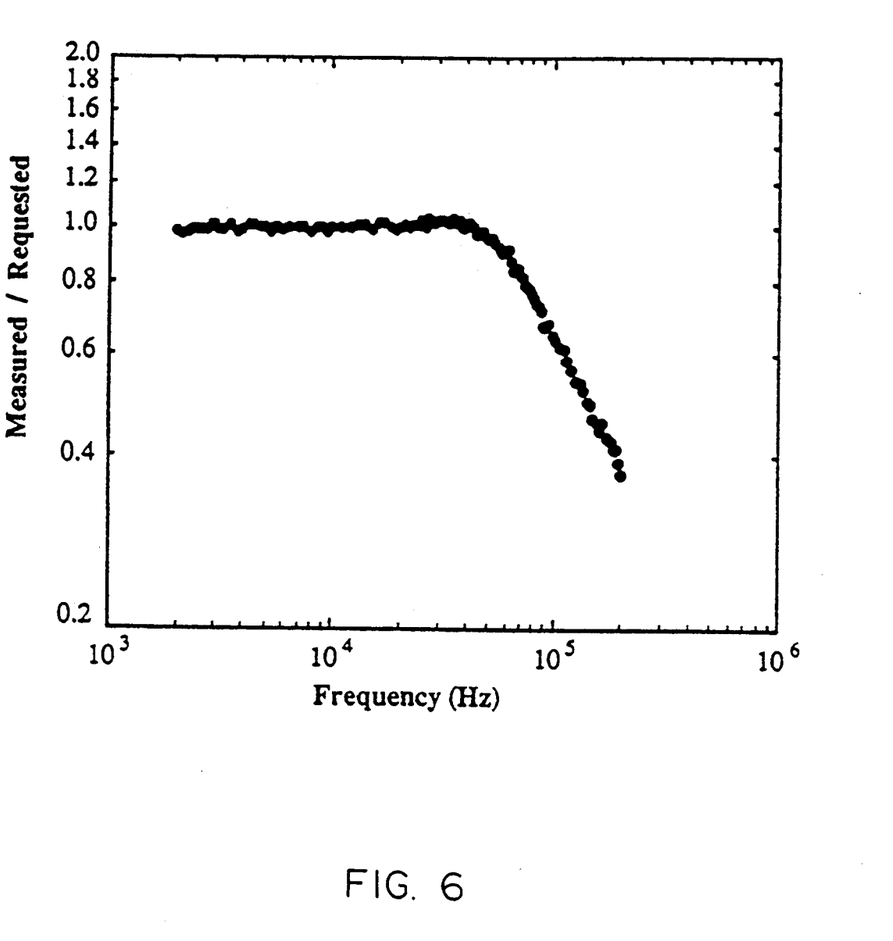
FIG. 6 is a graph of the ratio of measured to reference oscillations in the tunneling current as a function of frequency demonstrating a bandwidth measurement of 50 KHz.
Figure 7:
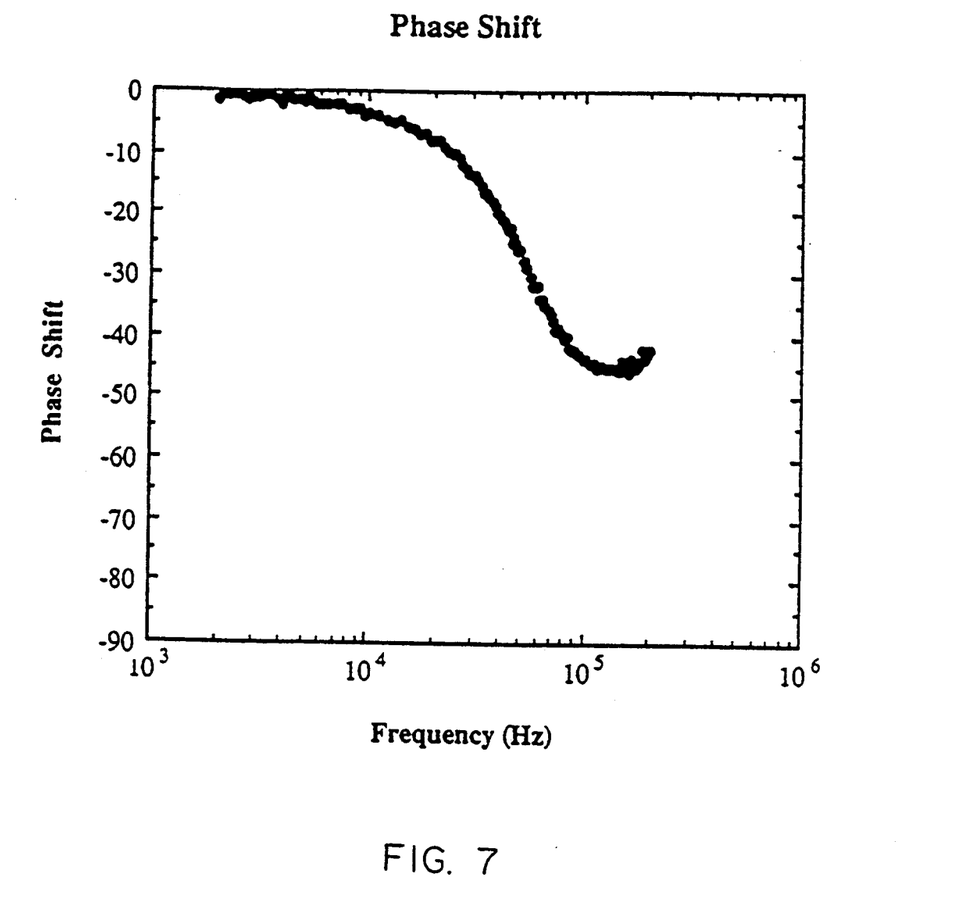
FIG. 7 is a graph of the measured phase shift versus frequency during the bandwidth measurement of FIG. 6.

These transducers were made operational and routine characterizations were carried out. FIG. 6 shows a measurement of the bandwidth of the transducer. To carry out this measurement, a white noise voltage source is added to the reference input of the feedback loop. The feedback loop responds by generating a corresponding amplified signal with a white noise distribution at the deflection electrode, which causes fluctuations in the position of the diaphragm, as well as fluctuations in the tunneling current. FIG. 6 shows the ratio of the measured fluctuation amplitude to the reference fluctuation amplitude as a function of frequency as recorded by a standard spectrum analyzer. At all frequencies up to 50 kHz, the transducer is able to accurately reproduce the reference current fluctuations. Above 50 kHz, this response begins to roll off because of the bandwidth of the preamplifier. FIG. 7 shows the phase shift between the measured and requested current. This phase shift is less than 5 degrees for frequencies below 10 kHz, and increases to 30 degrees at 50 kHz. At frequencies above 100 kHz, capacitive coupling between the noise source and the transducer begins to contribute to the measurement, as evidenced by the variation in the phase shift at those frequencies. This transducer is presently being used as part of an infrared sensor.

Having thus described an exemplary embodiment of the invention, what is claimed is:

1. An infrared sensor comprising:
   an enclosed chamber;
   a gas in said chamber;
   a metal closed flexible silicon nitride membrane forming a deflectable wall of said enclosed chamber;
   a metal coated silicon tip within tunneling distance of said membrane for establishing a tunneling current therebetween depending upon said distance;
   at least one electrode in spaced, opposing proximity to said membrane for electrostatically controlling the deflection of said membrane; and
   a feedback circuit connected to said tip for sensing said tunneling current and to said electrode for maintaining the deflection of said membrane irrespective of the level of infrared radiation incident upon said chamber.

2. The infrared sensor recited in claim 1 wherein said membrane is coated with gold.

3. The infrared sensor recited in claim 1 wherein said tip is coated with gold.

4. The infrared sensor recited in claim 1 wherein said membrane is coated with a layer of adhesion material, a layer of barrier material and a layer of metal.

5. The infrared sensor recited in claim 4 wherein said adhesion material is titanium.

6. The infrared sensor recited in claim 4 wherein said barrier material is platinum.

7. The infrared sensor recited in claim 4 wherein said metal is gold.

8. The infrared sensor recited in claim 1 wherein said tip is coated with a layer of adhesion material, a layer of barrier material and a layer of metal.

9. The infrared sensor recited in claim 8 wherein said adhesion material is titanium.

10. The infrared sensor recited in claim 8 wherein said barrier material is platinum.

11. The infrared sensor recited in claim 8 wherein said metal is gold.

12. The infrared sensor recited in claim 1 wherein said gas is air.

13. In a tunneling infrared sensor of the type having a gas-enclosing chamber, a deflectable membrane and an electrode tip for establishing a tunneling current dependent upon the deflection of said membrane in response to incident infrared radiation; the improvement comprising:
   at least one deflection electrode positioned in spaced relation to said membrane for electrostatically controlling the deflection of said membrane; and
   a feedback circuit connected between said tip and said electrode and responsive to said tunneling current for maintaining the deflection of said membrane within a selected range irrespective of the level of incident infrared radiation.

14. The improvement recited in claim 13 wherein said feedback circuit produces a voltage at said deflection electrode, the magnitude of said voltage being proportional to the difference between said tunneling current and a preset reference current.

15. The improvement recited in claim 14 wherein said feedback circuit has a bandwidth of at least 50 kHz.

16. The improvement recited in claim 13 wherein said membrane has a mechanical resonance frequency which is at least 10 kHz.

17. An infrared sensor of the type having a gas-enclosing chamber responsive to incident infrared radiation and comprising:
   a tunneling transducer configured for generating a tunneling current dependent upon the level of incident infrared radiation; said tunneling transducer having a tunneling tip and a deflection membrane; and
   electrostatically controlled deflection means responsive to said tunneling current for retaining the deflection of said membrane substantially constant irrespective of said level of said infrared radiation.

* * * * *